United States Patent
Doi

(10) Patent No.: US 9,262,227 B2
(45) Date of Patent: Feb. 16, 2016

(54) VIRTUAL MACHINE MANAGEMENT METHOD AND APPARATUS

(71) Applicant: FUJITSU LIMITED, Kawasaki-shi, Kanagawa (JP)

(72) Inventor: Tsunehisa Doi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 14/305,050

(22) Filed: Jun. 16, 2014

(65) Prior Publication Data

US 2014/0298338 A1    Oct. 2, 2014

Related U.S. Application Data

(63) Continuation of application No. PCT/JP2012/050273, filed on Jan. 10, 2012.

(51) Int. Cl.
*G06F 9/455* (2006.01)
*G06F 9/50* (2006.01)
*G06F 9/48* (2006.01)

(52) U.S. Cl.
CPC ............ *G06F 9/5016* (2013.01); *G06F 9/4856* (2013.01)

(58) Field of Classification Search
CPC .................................................. G06F 9/45533
USPC .................................................. 718/1; 711/6
See application file for complete search history.

(56) References Cited

U.S. PATENT DOCUMENTS

| 8,478,961 | B2* | 7/2013 | Bozek | G06F 9/45558 |
| | | | | 711/118 |
| 9,063,762 | B2* | 6/2015 | Serebrin | G06F 9/455 |
| 2006/0197850 | A1 | 9/2006 | Goko et al. | |
| 2011/0161491 | A1 | 6/2011 | Sekiguchi | |

FOREIGN PATENT DOCUMENTS

| JP | 2006-243940 | 9/2006 |
| JP | 2010-233020 | 10/2010 |
| JP | 2010-238044 | 10/2010 |
| JP | 2011-108014 | 6/2011 |
| JP | 2011-138184 | 7/2011 |
| JP | 2011-210151 | 10/2011 |
| JP | 2011-221945 | 11/2011 |

OTHER PUBLICATIONS

International Search Report of Int. Appl. No. PCT/JP2012/050273 dated Mar. 13, 2012.

* cited by examiner

*Primary Examiner* — Andy Ho
(74) *Attorney, Agent, or Firm* — Fujitsu Patent Center

(57) ABSTRACT

A non-transitory computer-readable recording medium has a program stored therein for causing a computer to execute a process. The process includes estimating a cost of executing a live migration of a virtual machine, using a count value of an access counter for counting the number of accesses to a memory allocated to the virtual machine, a capacity of the memory, and a bandwidth of data transfer between physical machines relating to the live migration.

12 Claims, 13 Drawing Sheets

VIRTUAL MACHINE MANAGEMENT METHOD AND APPARATUS

CROSS-REFERENCE TO RELATED APPLICATIONS

This application is a continuation application of International Application PCT/JP2012/050273 filed on Jan. 10, 2012 and designated the U.S., the entire contents of which are incorporated herein by reference.

FIELD

The disclosures herein generally relate to a program, a method, and an apparatus for virtual machine management.

BACKGROUND

In recent years, virtual machine technology (virtualization technology) has been actively used for running virtual machines (VM) on physical machines (PM). By using the virtual machine technology, multiple virtual machines can run on a single physical machine. And each of the virtual machines can run an operating system and/or an application that may be different from those running on the other virtual machines.

By introducing the virtual machine technology on a server, multiple virtualized servers can be aggregated in one physical server. This aggregation is reasonable, and results in cost reduction. However, for example, there are cases where one of the aggregated virtual machines may adversely influence the other virtual machines when load states of the virtual machines change. Therefore, live migration technology has been developed in the virtual machine technology that migrates a virtual machine to another physical machine without stopping services provided by the virtual machine.

An overview of the live migration technology will be described. Live migration methods can be classified into the pre-copy method and the post-copy method. When executing a live migration, switching needs to be executed for a virtual machine to be migrated, at least for its contents of the physical memory, storage, and network. The pre-copy method is a method that moves the state of a CPU after having the content of the physical memory moved. In contrast to the above, the post-copy method moves the state of the CPU without moving the content of the physical memory. In this case, although the content of the physical memory has not been moved to a destination machine, the address translation table of the virtual memory system on the destination machine is set to an empty state. With this setting, when the CPU accesses the memory on the destination machine, data to be accessed does not exist in the physical memory at an initial stage. Therefore, a page fault occurs, which causes required pages loaded from a hard disk to fill the physical memory.

Note that a large-capacity memory does not need to be moved on the hard disk because the large-capacity memory on the hard disk is shared when using either of the methods.

There is a conventional technology that determines whether a live migration is feasible when a live migration is requested, and stops the live migration if a negative determination is obtained (see, for example, Patent Document 1). This technology assigns an attribute of safety level to each VM to prevent a low safety level VM and a high safety level VM from running on the same computer. This avoids a circumstance where execution of a high safety level VM is adversely influenced by a defect of a low safety level VM.

Also, there is a technology that determines necessity of a migration based on load information just before executing the migration to avoid unnecessary migrations (see, for example, Patent Document 2). Note that, as for the load information, Patent Document 2 only discloses CPU usage rates and memory usage rates of a source server, a destination server, and a virtual machine.

Also, there is a technology that estimates time required for movement for a virtual machine to move from a physical machine, on which the virtual machine is currently running, to another physical machine (see, for example, Patent Documents 3-4). Patent Documents 3 and 4 disclose that memory transfer time can be estimated using a memory change rate.

Also, there is a technology that determines a degree of difference between two consecutive frames of images using a counter value that counts the number of write accesses to a frame memory of a camera (see, for example, Patent Document 5).

A rate of memory overwrites during a memory transfer in a live migration (namely, a rate of copy operations that need to be executed again) is called a "dirty rate" (or "memory change rate"). The dirty rate is a value obtained by dividing an amount of memory change by an amount of memory transfer. If the dirty rate is too high, there may be a case where a memory transfer cannot be completed. To cope with such a case, an implementation may be adopted that stops the context to forcibly end a memory transfer. In this case, likelihood is high for service outage time to exceed an acceptable range. It should be avoided to exceed the limit of service outage time that is specified in a service level agreement (SLA) with a customer who uses a service of virtual machines. Therefore, to avoid such a long service outage, there is a case where load distribution is secured by stopping a live migration of a virtual machine to be migrated, and instead, executing a live migration of another virtual machine.

Therefore, it is necessary to avoid a state where a context stop continues for a long time due to a live migration, or stoppage of a live migration in advance. To achieve these requirements, it is necessary to keep load of a physical machine at a low level in usual operations before a live migration, and to obtain a memory dirty rate so that a memory transfer time can be predicted for executing a live migration.

Note that a prediction value T of a memory transfer time required for a live migration is obtained by the following formula where M is a memory capacity, tp is a data transmission band width (transfer throughput) used for a live migration, and r is a dirty rate (a value obtained by dividing an amount of memory change by an amount of memory transfer).

$$T=M/\{tp(1-r)\} \quad (1)$$

Therefore, the memory transfer time for a live migration can be estimated if the dirty rate in usual operations is obtained.

However, there is an overhead increase to detect the dirty rate in general. A method of detecting the dirty rate for a live migration is as follows. First, an area that has been copied is set as a write-protected area at a hardware level. Then, a write request to the write-protected area is trapped at a software level. The trap triggers a predetermined routine to operate for detecting the write to the specific area, and for storing information about the write. This process makes the routine operate every time a write is trapped, which causes an increase in overhead. Therefore, if this process is used for detecting the dirty rate in usual operations, a considerable overhead is inevitably generated. This makes the load greater for the usual operations of the virtual machine.

Therefore, a technology has been needed for quickly obtaining estimation values of a dirty rate and a memory transfer time for a pre-copy in usual operation while a live migration is not being executed.

RELATED-ART DOCUMENTS

Patent Documents

[Patent Document 1] Japanese Laid-open Patent Publication No. 2010-238044
[Patent Document 2] Japanese Laid-open Patent Publication No. 2011-108014
[Patent Document 3] Japanese Laid-open Patent Publication No. 2011-138184
[Patent Document 4] Japanese Patent Application No. 2010-233020
[Patent Document 5] Japanese Laid-open Patent Publication No. 2006-243940

SUMMARY

According to at least one embodiment of the present invention, a non-transitory computer-readable recording medium has a program stored therein for causing a computer to execute a process. The process includes estimating a cost of executing a live migration of a virtual machine, using a count value of an access counter for counting the number of accesses to a memory allocated to the virtual machine, a capacity of the memory, and a bandwidth of data transfer between physical machines relating to the live migration.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments of the present invention will be described with reference to the drawings. It should be noted that the following embodiments are provided for understanding the present invention, not for limiting the scope of the present invention. Also, the multiple embodiments in the following description are not mutually exclusive. Therefore, it is noted that any combinations of different embodiments can be realized unless any contradictions arise. Also, steps of any one of the methods or programs described in claims may be executed in a different order of the steps, or multiple steps may be executed concurrently. Further, it is obvious that these embodiments are included within a technological scope of the claims.

A pre-copy method is assumed to be adopted in the embodiments of the present invention.

An overview of the pre-copy method will be described in the following.

Figure 1:
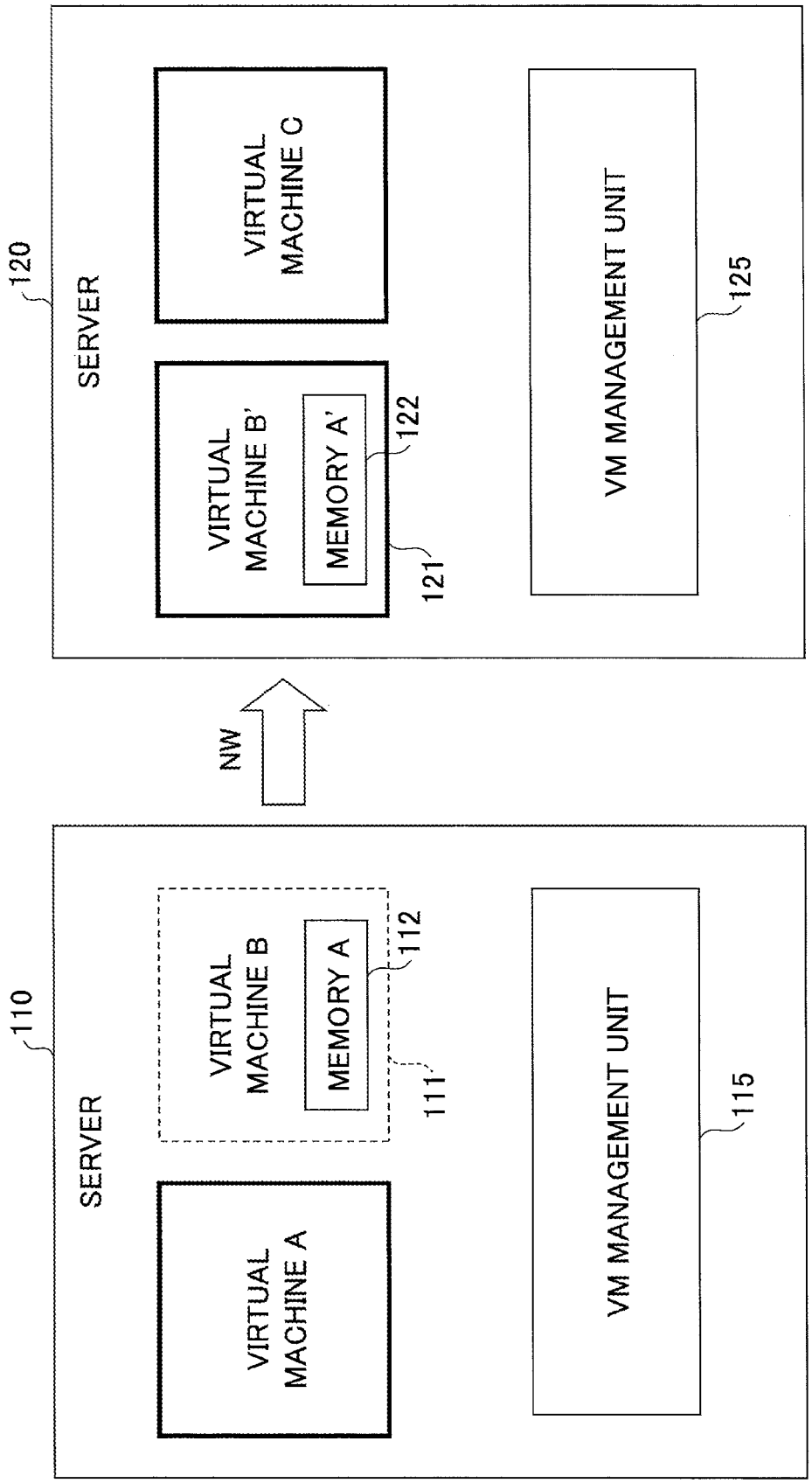
FIG. 1 is a schematic view illustrating an example of a live migration of a virtual machine.

FIG. 1 illustrates an example of a live migration of a virtual machine B111. The virtual machine B111 runs on the server 110, which is a physical machine, under control of a VM management unit 115. The virtual machine B111 manages its own virtual memory space. A physical memory area in the physical memory of the server 110 is referred to as a memory A112 that is included in the virtual memory managed by the virtual machine B111. A case will be described where a live migration is executed in this state so that the virtual machine B111 is migrated to the server 120 and runs as a virtual machine B'121 on the server 120. The server 120 includes a VM management unit 125. Also, a physical memory area in the physical memory of the server 120 is referred to as a memory A'122 that is included in the virtual memory managed by the virtual machine B'121, which is the area to be copied.

Figure 2:
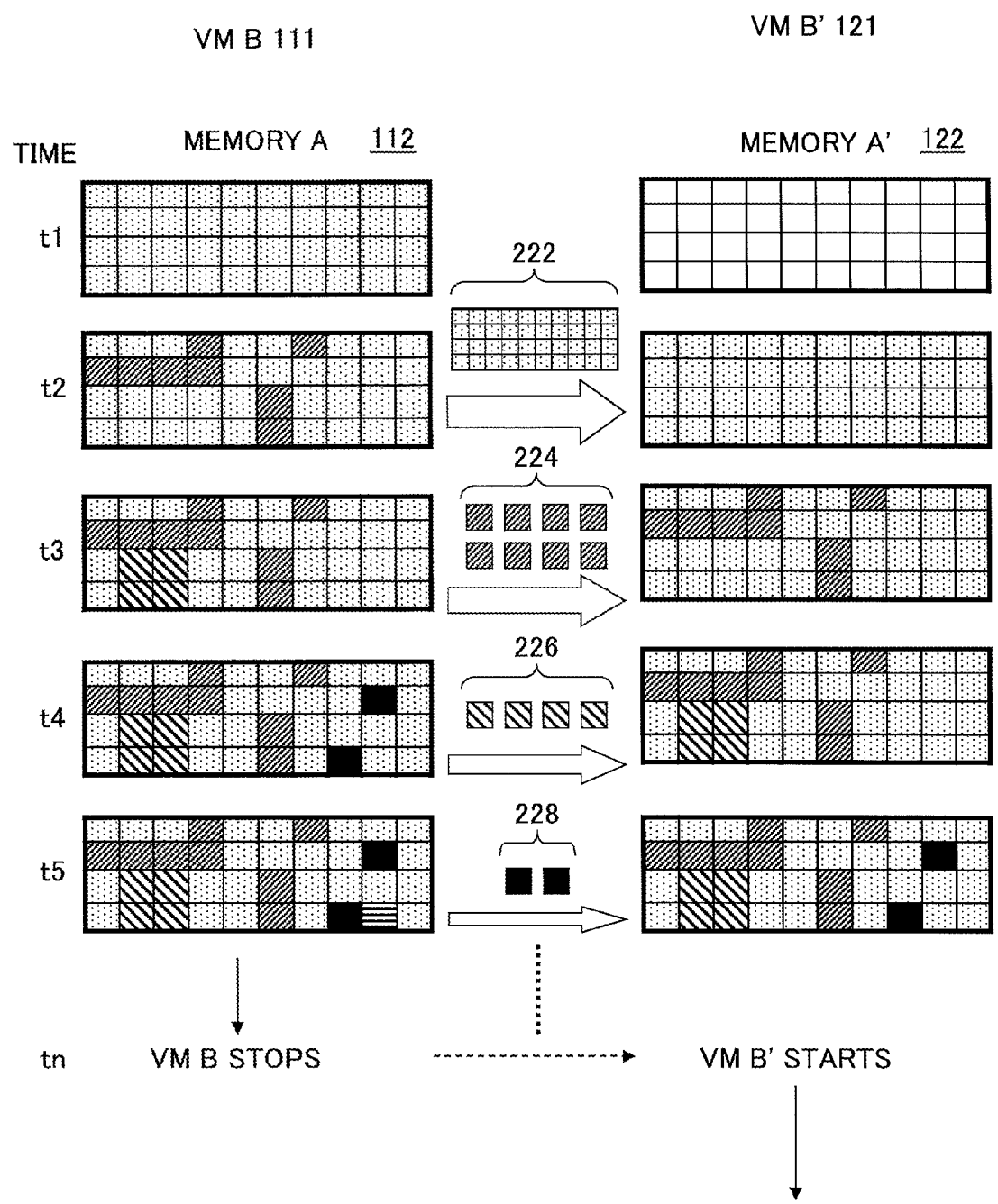
FIG. 2 is a schematic view illustrating a process of copying a memory.

FIG. 2 illustrates a process of copying a physical memory. To execute a live migration using the pre-copy method, first, it is necessary to copy the content of the physical memory A112 managed by the virtual machine B111 to the physical memory A'122 on the server 120 (as described above, a virtual memory area that has swapped out to a hard disk does not need to be copied because both servers share the hard disk). At time t1, the content of the memory A112 differs from the content of the memory A'122.

At time t2, a copy operation starts for copying overall information 222 of the content of the memory A112 to the memory A'122. During the copy operation, the content of the memory A112 is being overwritten.

At time t3, a copy operation starts for copying data 224 that has been overwritten during the immediately preceding transfer to the memory A'122. During the copy operation, the content of the memory A112 is being overwritten.

At time t4, a copy operation starts for copying data 226 that has been overwritten during the immediately preceding transfer to the memory A'122. During the copy operation, the content of the memory A112 is being overwritten.

At time t5, a copy operation starts for copying data 228 that has been overwritten during the immediately preceding transfer to the memory A'122. During the copy operation, the content of the memory A112 is being overwritten.

The above operations are repeated until an estimated copy time for remaining data becomes, for example, less than or equal to one second (or the amount of remaining data to be copied becomes less than or equal to a predetermined amount). At time tn, if the estimated copy time for remaining data becomes less than or equal to one second, the context of the virtual machine B111 is stopped. Then, the remaining copy part is copied from the memory A112 to the memory A'122, and the register information of the CPU of the virtual machine B111 is copied to the virtual machine B'122. Also, the storage and network are switched.

After that, the virtual machine B'121 is started. By these operations, a live migration of the virtual machine B111 is executed from the server 110 to the server 120.

As above, multiple copy operations are required for making a copy without a difference because the memory of a running virtual machine is kept on changing.

[Embodiments]

Figure 3:
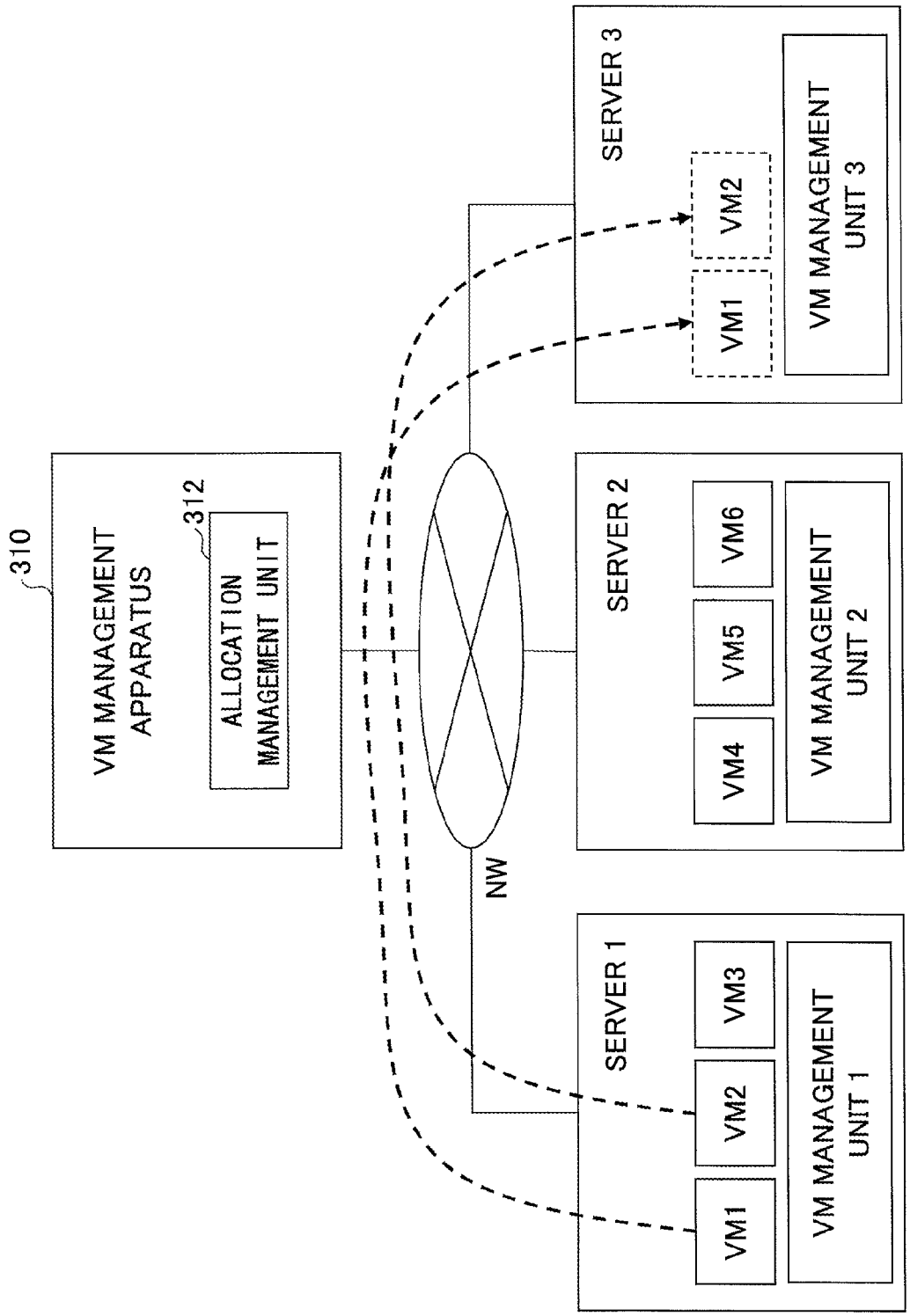
FIG. 3 is a schematic view illustrating an overall configuration of apparatuses relating to an embodiment of the present invention.

FIG. 3 illustrates an overall configuration of apparatuses relating to the embodiments of the present invention. As illustrated in FIG. 3, a VM management apparatus 310, a server 1, a server 2, and a server 3 are connected with each other by a network NW. These are all physical machines. Virtual machines VM1, VM2, and VM3 run on the server 1. These virtual machines are managed by a VM management unit 1. The VM management unit 1 holds operational states of the respective virtual machines, and provides a virtual machine environment, which includes an external interface, for the virtual machines. Also, the VM management unit 1 may execute a live migration in cooperation with the VM management apparatus 310. Similarly, virtual machines VM4, VM5, and VM6 run on the server 2 managed by a VM management unit 2. The server 3 includes a VM management unit 3. FIG. 3 illustrates a state where the virtual machines VM1 and VM2 on the server 1 are being prepared for a live migration to the server 3.

The VM management apparatus 310 manages all virtual machines that exist on the server 1, the server 2, and the server 3. The allocation management unit 312 makes a plan of dynamic relocation of the virtual machines based on operational states of the respective virtual machines, operational states of the respective physical machines, and information including a command of an operator, and then, executes the plan with live migrations. An allocation management unit 312 may also monitor a state of a live migration to stop the live migration if necessary.

Note that the physical machines in FIG. 3 do not need to be contained in different housings. Also, the allocation management unit 312 may exist in the physical machines where the virtual machines exist. Also, the physical machines may execute information transmission with a communication function using a medium other than the network NW. Alternatively, the network NW may transmits information in cooperation with the other communication function. By making the bandwidth greater with multiple paths for information transmission, time required for a live migration can be shortened.

Figure 4:
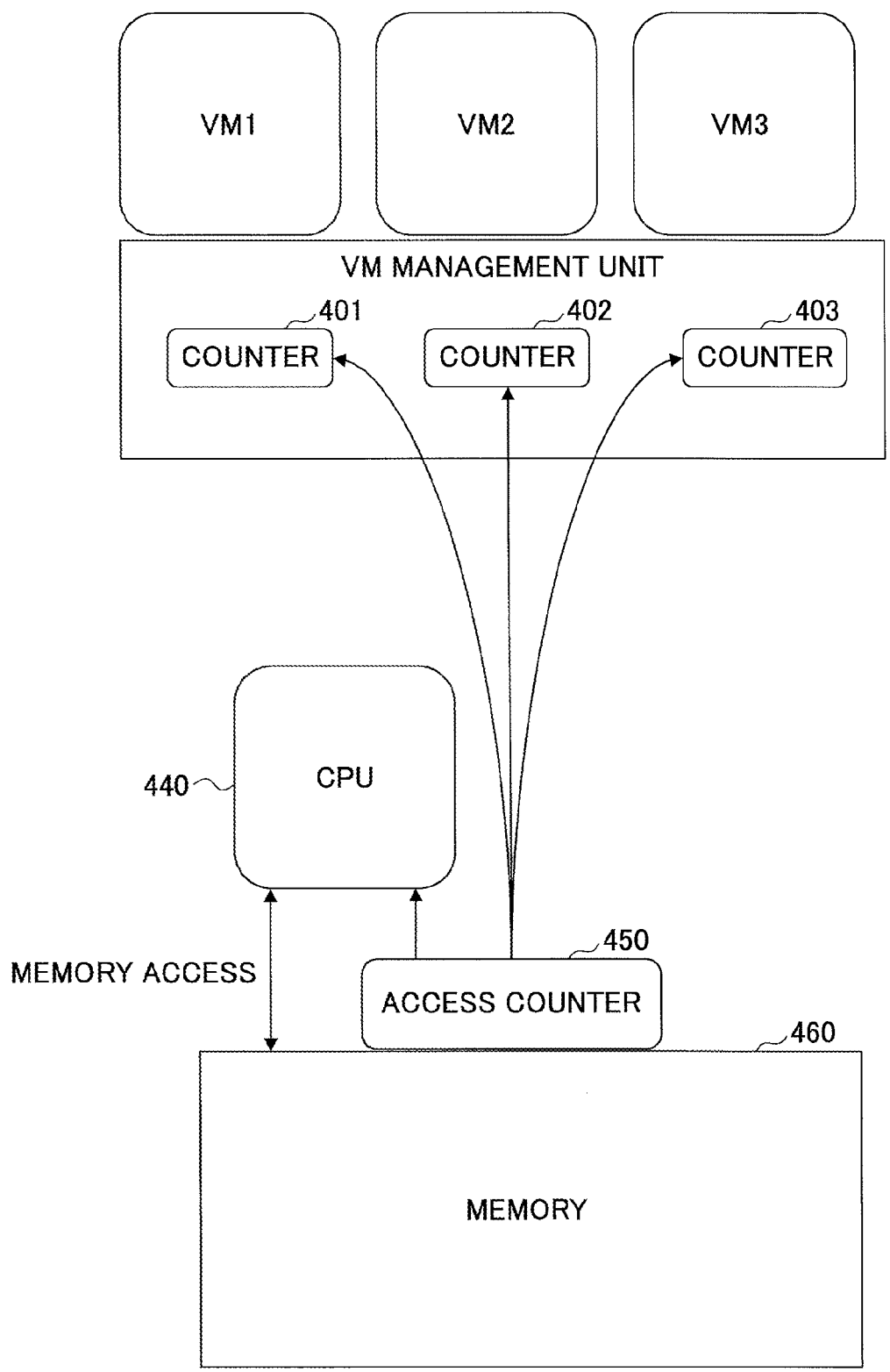
FIG. 4 is a schematic view illustrating an embodiment.

FIG. 4 illustrates an embodiment of the present invention. A functional block diagram and a hardware block diagram of the server 1 are illustrated in the upper and lower halves of FIG. 4, respectively. Note that the diagrams are arranged vertically with upward arrows to designate data flow in FIG. 4.

The VM management unit manages virtual machines VM1, VM2, and VM3. The VM management unit includes counters 401, 402, and 403 for counting memory accesses to the virtual machines VM1, VM2, and VM3, respectively. The server 1 may include a CPU 440, a physical memory 460, and an access counter 450 as illustrated in the hardware block diagram. The access counter 450 is implemented in hardware.

Here, hardware means hardware including wired logic and/ or a microprogram.

Although the access counter 450 is provided adjacent to the physical memory 460 in the hardware block diagram, the access counter 450 may be positioned at another place such as a portion in the CPU 440. The VM management unit may periodically read the access counter 450 using timer interruptions. Based on the value of the access counter 450, the VM management unit counts and accumulates the number of accesses to each of the VM1, VM2, and VM3, and holds the numbers in the counters 401, 402, and 403, respectively. As a result, the counters 401, 402, and 403 store the number of accesses to the VM1, VM2, and VM3, respectively. Note that the access counter 450 may be reset every time a virtual machine is switched (every time a context is switched).

Note that information about a specific overwritten location in the memory cannot be identified because there is only one access counter 450 in the present embodiment. Therefore, assuming that memory transfer in a live migration is executed by units of pages, the dirty rate r of the physical memory managed by the VM1 is represented by the following formula where a represents a weight, W represents the capacity of a page, n represents the number of memory writes per unit time recorded in the counter 401, and tp represents the transfer amount per unit time (namely, throughput).

$$r = \alpha n W / tp \tag{2}$$

Note that the weight α is provided for taking multiple writes in the same page into consideration. Namely, if multiple writes are done on a specific page, only this page needs to be transferred again. Therefore, the weight α is less than one.

Therefore, by substituting formula (2) for r in formula (1), expected transfer time $T_{VM1}$ of the memory managed by the VM1 is represented by the following formula.

$$T_{VM1} = M / \{tp(1 - \alpha n W / tp)\} \tag{3}$$

Note that if the access counter 450 counts the number of accesses for both writes and reads, and the rate of writes is assumed to be β for the total number of counted accesses, expected transfer time $T_{VM1}$ of the memory managed by the VM1 is represented by the following formula.

$$T_{VM1} = M / \{tp(1 - \beta \alpha n W / tp)\} \tag{4}$$

This transfer time $T_{VM1}$ is used as an estimated value of memory transfer time for a live migration. Transfer time $T_{VM1}$ may be recognized as an estimated cost for a live migration of the VM1 because it represents a resource consumed as time.

The weight α above relates to a degree of dispersion of memory access. Here, α and β may be determined beforehand by statistically measuring memory access while a virtual machine is running. Also, these values may be determined beforehand for respective virtual machines. Also, these values may be determined beforehand for respective applications that run on virtual machines.

The counters 401, 402, and 403 accumulate and store the number of accesses to the VM1, VM2, and VM3, respectively. The number of accesses per unit time may be calculated by obtaining the difference of counter values between the start of a unit time and the end of the unit time. Alternatively, the value of a counter is read at unit time intervals, and the counter is reset after respective reads. Contents of the counters may be used at the allocation management unit 312. Note that operations of the allocation management unit 312 will be described later using FIGS. 10-11.

Figure 5:
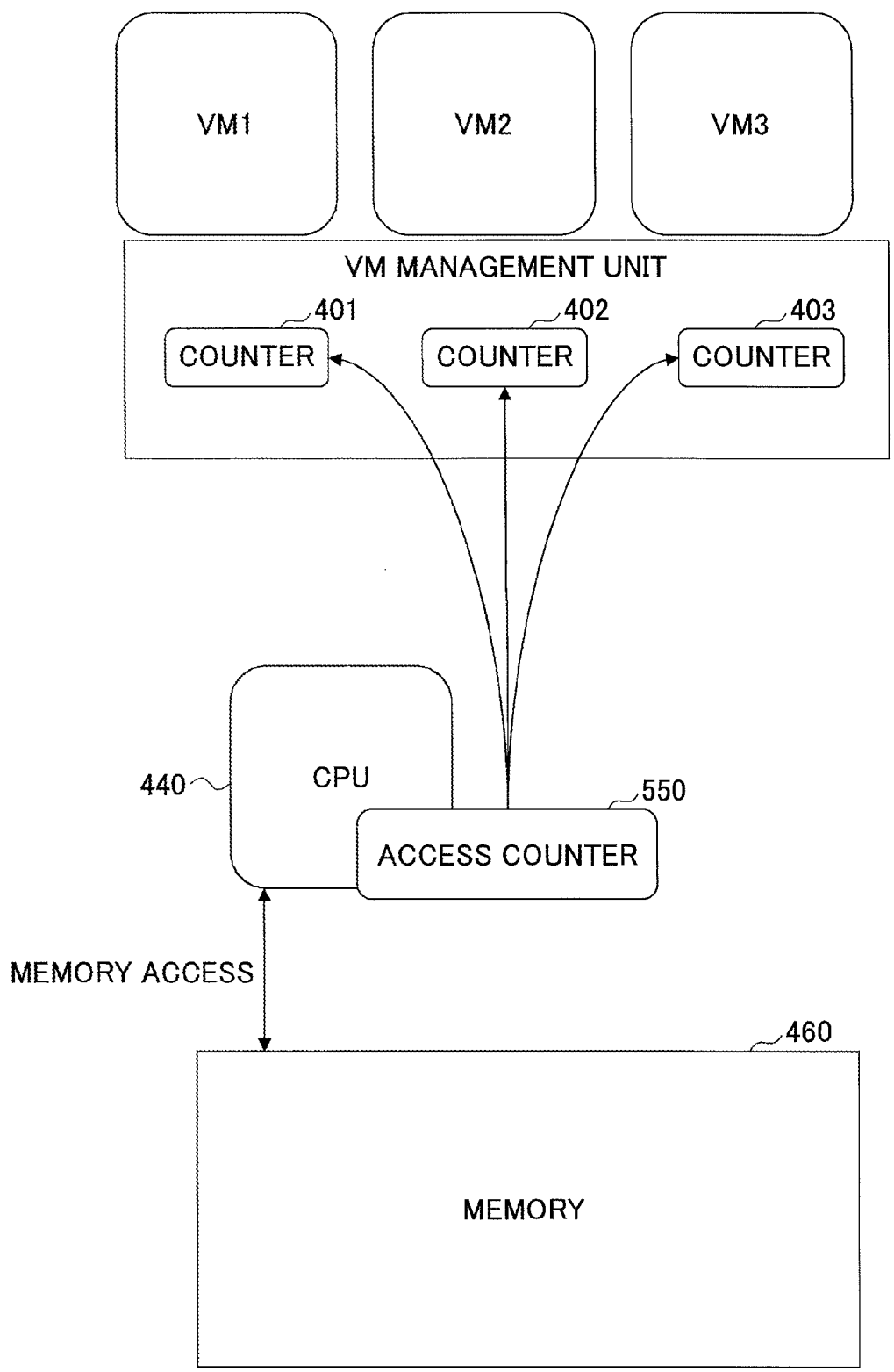
FIG. 5 is a schematic view illustrating an embodiment.

FIG. 5 illustrates another embodiment of the present invention. The CPU 440 includes multiple performance counters for measuring various kinds of performance. An access counter 550 may be used, which is a performance counter for counting write accesses to the physical memory 460. Other elements in FIG. 5 are the same as those in FIG. 4, and assigned the same numerical codes. The access counter 550 may be used in the same way as the access counter 450 in FIG. 4. The access counter 550 is a hardware counter; hence load of the CPU 440 is very small when using the access counter 550.

Note that hardware in this specification means hardware including hard-wired logic and/or a microprogram. Therefore, during usual operations while a live migration is not being executed, an estimated value (estimated cost) of memory transfer time can be obtained by formula (3) described above. In contrast to this, as described above, overhead increases if the method is introduced that puts the memory into a write-protected state to trap and count memory write accesses in software during usual operations. This overhead makes the load greater for usual operations. In respect of the overhead, the process of calculating an estimated value of a memory transfer in the present embodiment has a great advantage in that the process has virtually no influence on usual operations.

In addition, by obtaining an estimated cost of a live migration for each virtual machine in this way, an execution plan for live migrations can be determined more precisely. Note that determination of an execution plan will be concretely described later using FIGS. 10-11.

Figure 6:
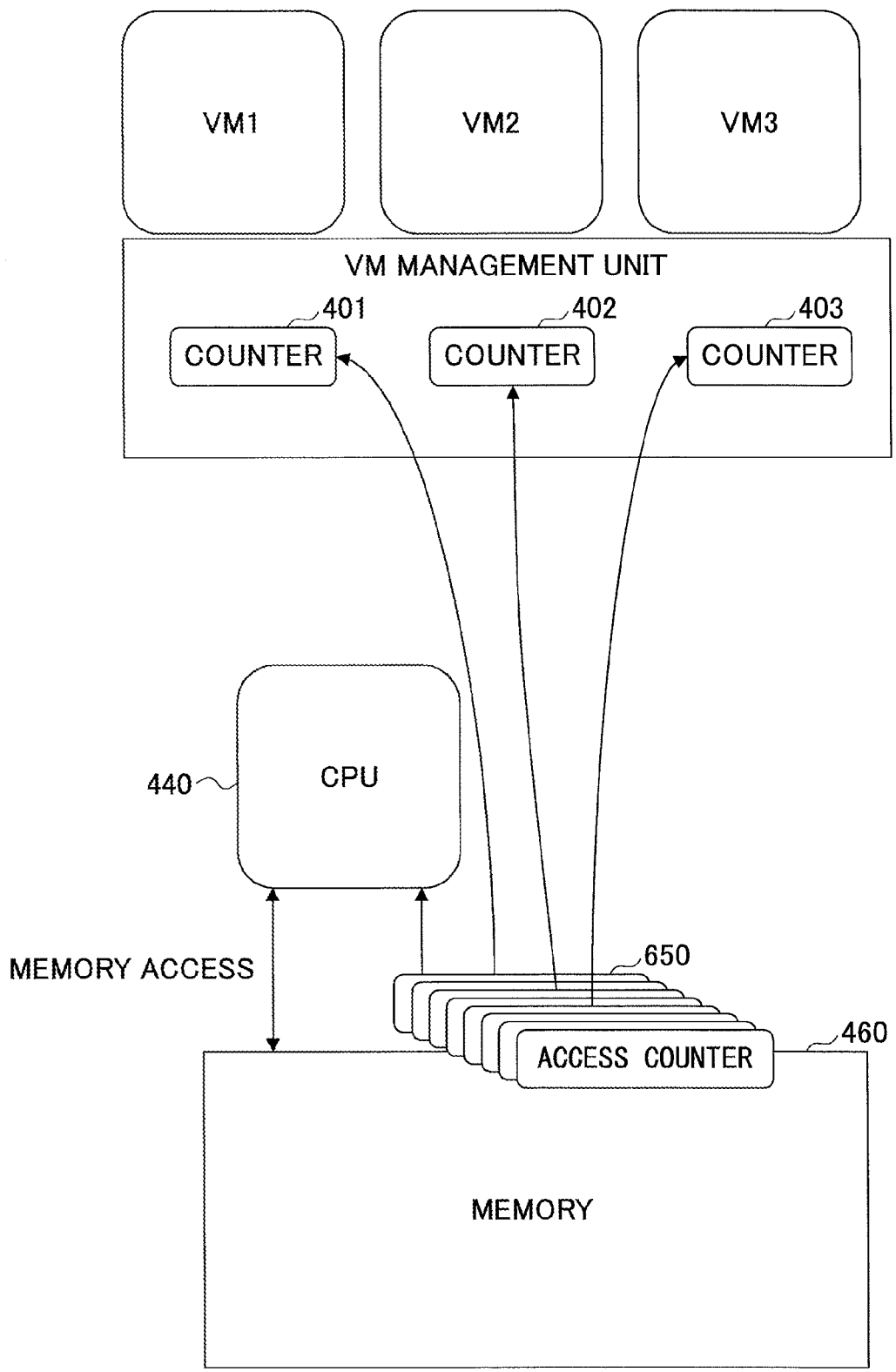
FIG. 6 is a schematic view illustrating an embodiment.

FIG. 6 illustrates yet another embodiment of the present invention. Note that the same elements as in FIGS. 4-5 are assigned the same numerical codes. Multiple access counters 650 are memory access counters that are provided for respective virtual machines, and are implemented in hardware. Therefore, an access counter only for one of the VMs, for example, the VM1, exits among multiple access counters 650. Therefore, the VM management unit reads the content of an access counter that corresponds to one of the virtual machines in the present embodiment. Then, the read value is accumulated in a counter in the VM management unit that corresponds to one of the virtual machines.

If the access counter 650 is to count write accesses, an estimated value of memory transfer time can be calculated using formula (3). Alternatively, if the access counter 650 is to count read and write access, an estimated value of memory transfer time can be calculated using formula (4).

Figure 7:
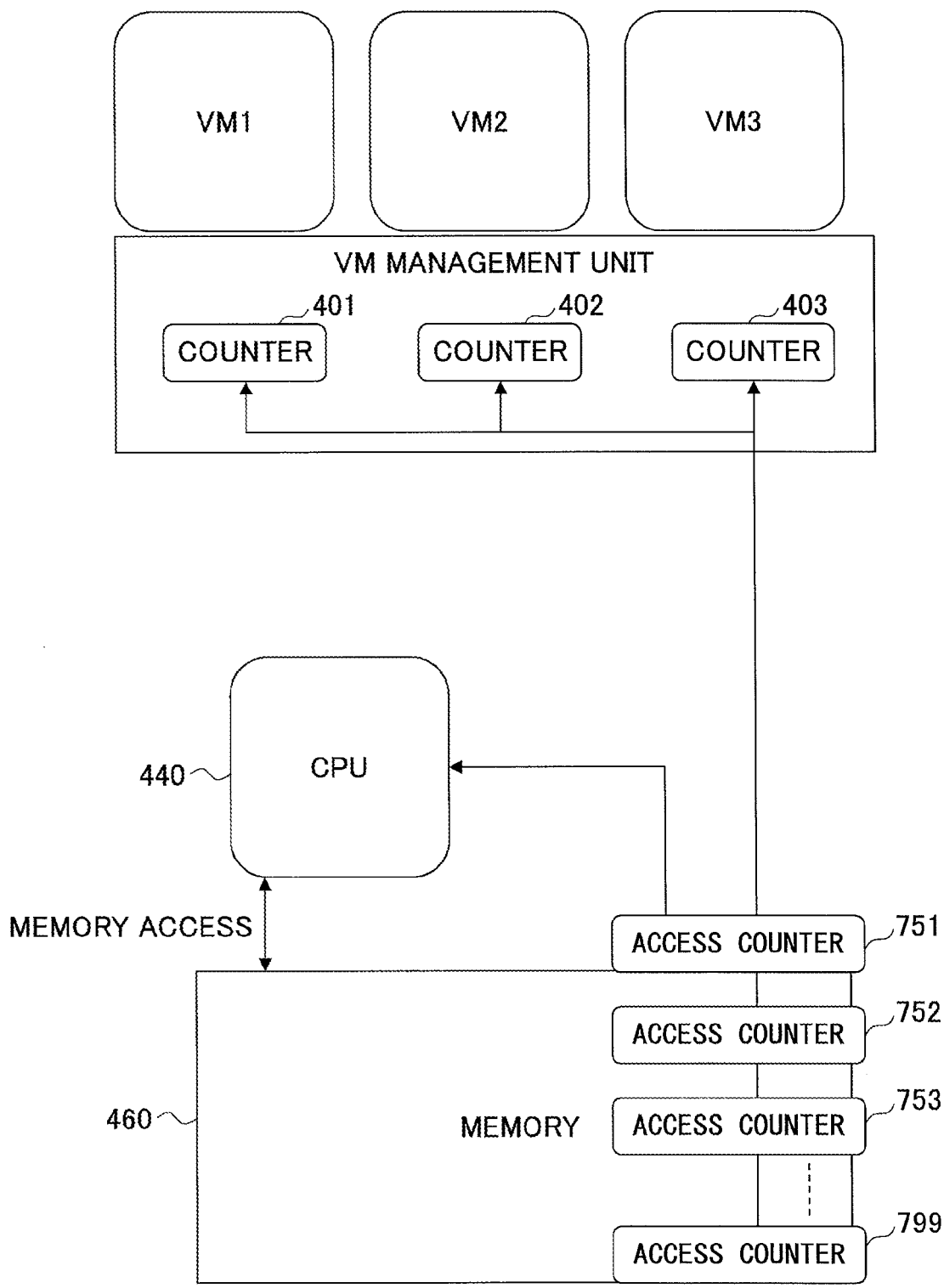
FIG. 7 is a schematic view illustrating an embodiment.

FIG. 7 further illustrates another embodiment of the present invention where access counters 751, 752, 753, . . . , and 799 are provided in the physical memory 460 by units of pages. These access counters may be provided, for example, for pages that are used for memory access management in a virtual memory system. Such a page may have the same unit size as the transfer unit size of a memory swap between the physical memory 460 and a dynamic storage device (not shown). Alternatively, the page may have the same unit size as the memory transfer unit size of a live migration. If the multiple access counters 751, 752, 753, . . . , and 799 are aggregated to be treated as one counter, the same process as in the first embodiment illustrated in FIG. 4 may be executed. Namely, values of the access counters for respective memory areas are summed as the number of memory accesses to respective virtual machines, which is then accumulated in the counter that corresponds to one of the virtual machines.

In the present embodiment, the number of memory accesses to each virtual machine is accumulated in a corresponding counter in the VM management unit. An estimated value of memory transfer time can be similarly obtained using formulas (3) or (4).

Note that the following process may be executed in the present embodiment as will be described with the VM1 taken as an example.

First, the following preconditions are assumed.

(1) The physical memory 460 has L pages (where L denotes the number of pages). Instead of counters 401, 402, and 403 that correspond to respective virtual machines in the VM management unit, L counters (not shown) are provided in the VM management unit, which corresponds to the L access counters. The L counters have initial values of zero.

Then, the following steps are executed using timer interruptions.

(A) Read each of the L access counters periodically using timer interruptions, and accumulate the read values in the L corresponding counters in the VM management unit.

(B) Using timer interruptions, read counters in the VM management unit for pages allocated to the VM1 at unit time intervals (for example, the unit time used for calculating a dirty rate), and examine the number of counters whose values are greater than zero (for example, j counters may be found). Examine the other virtual machines similarly. Reset the L counters in the VM management unit to zero.

In the above process, for example, a memory dirty rate $r_{VM1}$ for the VM1, which is obtained by dividing a memory change amount by a transfer amount, may be obtained by the following formula where W represents the capacity of a page, and tp represents a transfer amount per unit time (namely, throughput).

$$r_{VM1} = jW/tp \quad (5)$$

This dirty rate $r_{VM1}$ may fluctuate depending on time when data is obtained. Therefore, obtained values may be accumulated to obtain a moving average to be used as the dirty rate. Note that if an architecture is adopted in the physical memory 460 in which the number of pages of the physical memory allocated to each virtual machine is dynamically changed, care should be taken that this dirty rate $r_{VM1}$ is an approximate value.

Then, an estimated value of memory transfer time can be calculated from this dirty rate using formula (1).

One skilled in the art may come up with other modified examples from the above embodiments.

In the above embodiments, values of the counters in the VM management unit may be transmitted to the allocation management unit 312 in the VM management apparatus 310. The allocation management unit 312 may calculate an estimated value of memory transfer time.

As described above, counters for memory access are used in the above embodiments. As another modified example, a performance counter may be used that counts the number of references to a TLB (Translation Look aside Buffer) (not shown). When a CPU accesses a memory, a virtual address needs to be translated into a physical address. Therefore, a virtual memory system has an address translation table in which a virtual address is associated with a physical address. A TLB is a cache of such an address translation table, which can be accessed faster. Therefore, the CPU refers to the TLB to translate a virtual memory address into a physical memory address every time memory access is executed. Therefore, the number of references to the TLB is equivalent to, or highly correlated with the number of accesses. Therefore, if using a counter that counts the number of references to the TLB, substantially the same method can be adopted as in the embodiment illustrated in FIG. 4 or 5.

Figure 8:
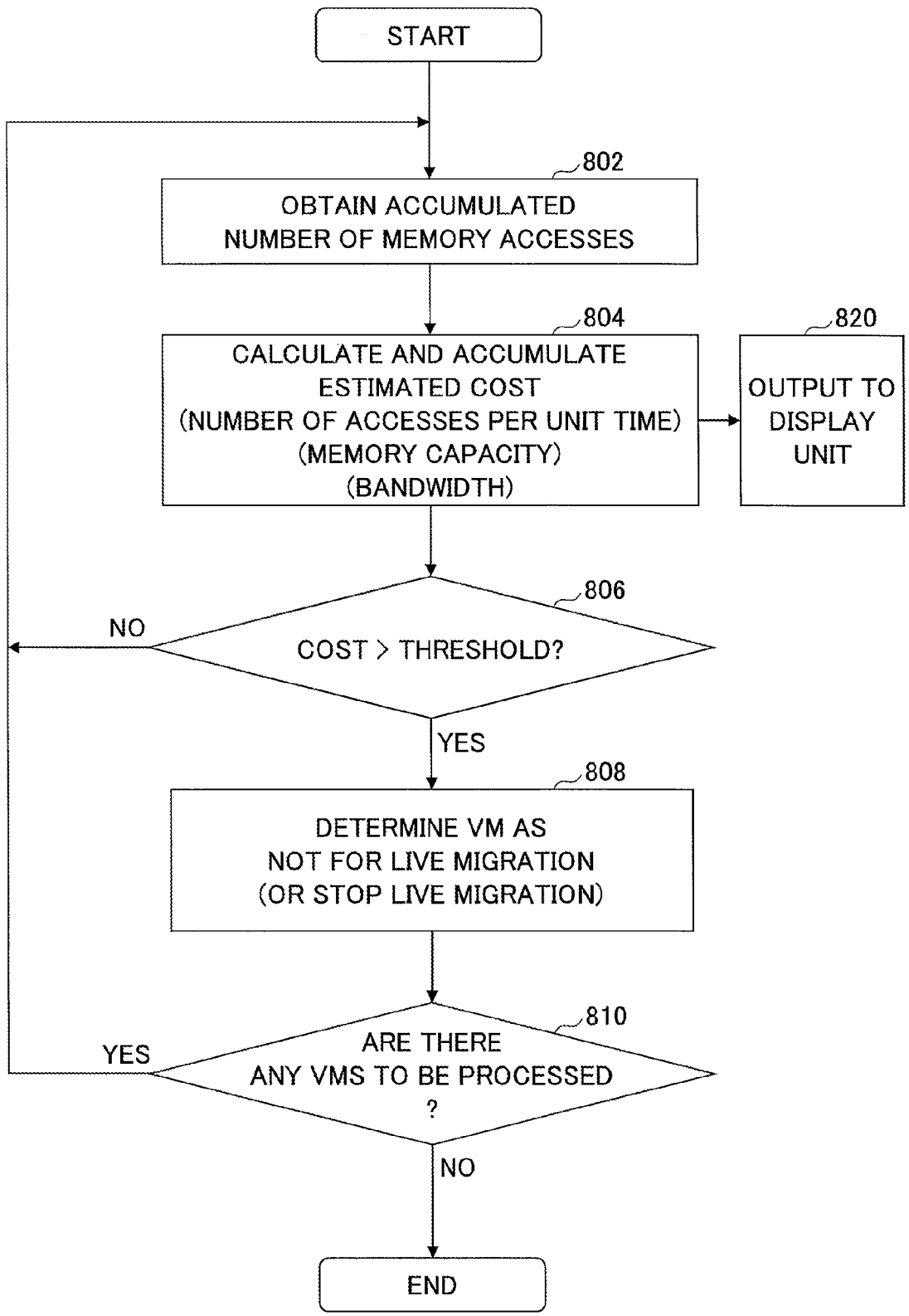
FIG. 8 is a schematic view illustrating a process flow in an allocation management unit.

FIG. 8 illustrates a process flow in the allocation management unit 312.

At Step 802, the number of memory accesses is obtained for each VM and accumulated in the VM management unit.

At Step 804, an estimated value of memory transfer time is calculated for the virtual machine by formula (1), (3), or (4). The estimated value of memory transfer time may be called the "estimated cost" for a migration.

The estimated cost may be output to a display unit at Step 820. Note that the displaying may be executed with an arbitrary one of the steps.

At Step 806, the estimated cost may be compared a predetermined threshold value. If it is determined "YES", the process goes forward to Step 808. If "NO", the process goes back to Step 802.

At Step 808, if the virtual machine has the estimated cost that exceeds the threshold value, the virtual machine may be excluded for a live migration. Alternatively, the virtual machine may be included in a list of virtual machines that are excluded for live migrations, which is used later for determining an allocation plan. In addition, if a live migration is being executed for the virtual machine, the live migration may be stopped.

At Step 810, it is determined whether any virtual machines are left to be processed. If it is determined "NO", all virtual machines have processed. If it is determined "YES", the process goes back to Step 802, and a next virtual machine is processed. Note that Step 820 may display various kinds of output information including a list of virtual machines excluded for live migrations and memory dirty rates.

The process in FIG. 8 may be triggered by a timer interruption. Or it may be executed by a command from an operator.

Figure 9:
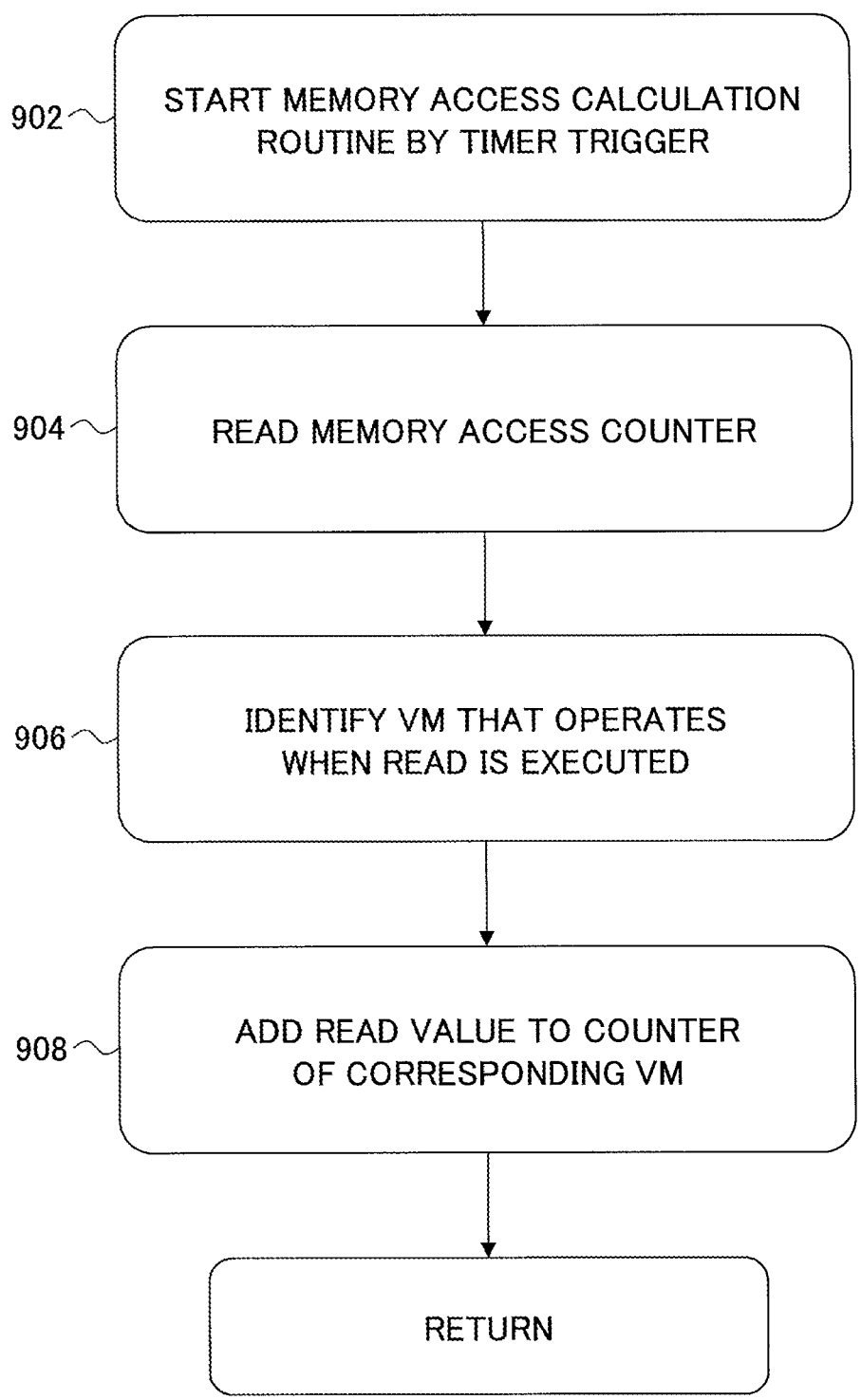
FIG. 9 is a schematic view illustrating a process executed on a counter in a VM management unit.

FIG. 9 is a schematic view illustrating a process executed on a counter in the VM management unit. This process may be triggered by a timer interruption.

Step 902 indicates that an interruption is generated by a timer that triggers this process.

At Step 904, the memory access counter is read. As described above, the memory access counter may take one of the various forms depending on the architecture of the physical machine.

At Step 906, a virtual machine is identified that runs at the very time when the memory access counter is read. It is identified by the VM management unit.

At Step 908, the read value is loaded in the counter of the corresponding virtual machine. The interval between reads of the access counter can be changed by setting the interval between timer interruptions. It is desirable to have the interval between timer interruptions shorter than an interval of virtual machine switching. By setting the interval in this way, it is possible to recognize how much the value of the access counter increases while a virtual machine runs. The increased value may be accumulated in the corresponding counter in the VM management unit. If it is possible to reset the access counter, it may be reset when the virtual machine switches. Alternatively, if the access counter can be set with a value, the value of the counter in the VM management unit is set when the virtual machine switches, and the access counter may continue to count up until it is switched with another virtual machine. Then, the result of counting up of the access counter may be overwritten in the counter in the VM management unit. Also, this process may be executed when the virtual machine switches.

Thus, the process triggered by the timer interruption is completed, and a process before the interruption may be resumed.

Figure 10:
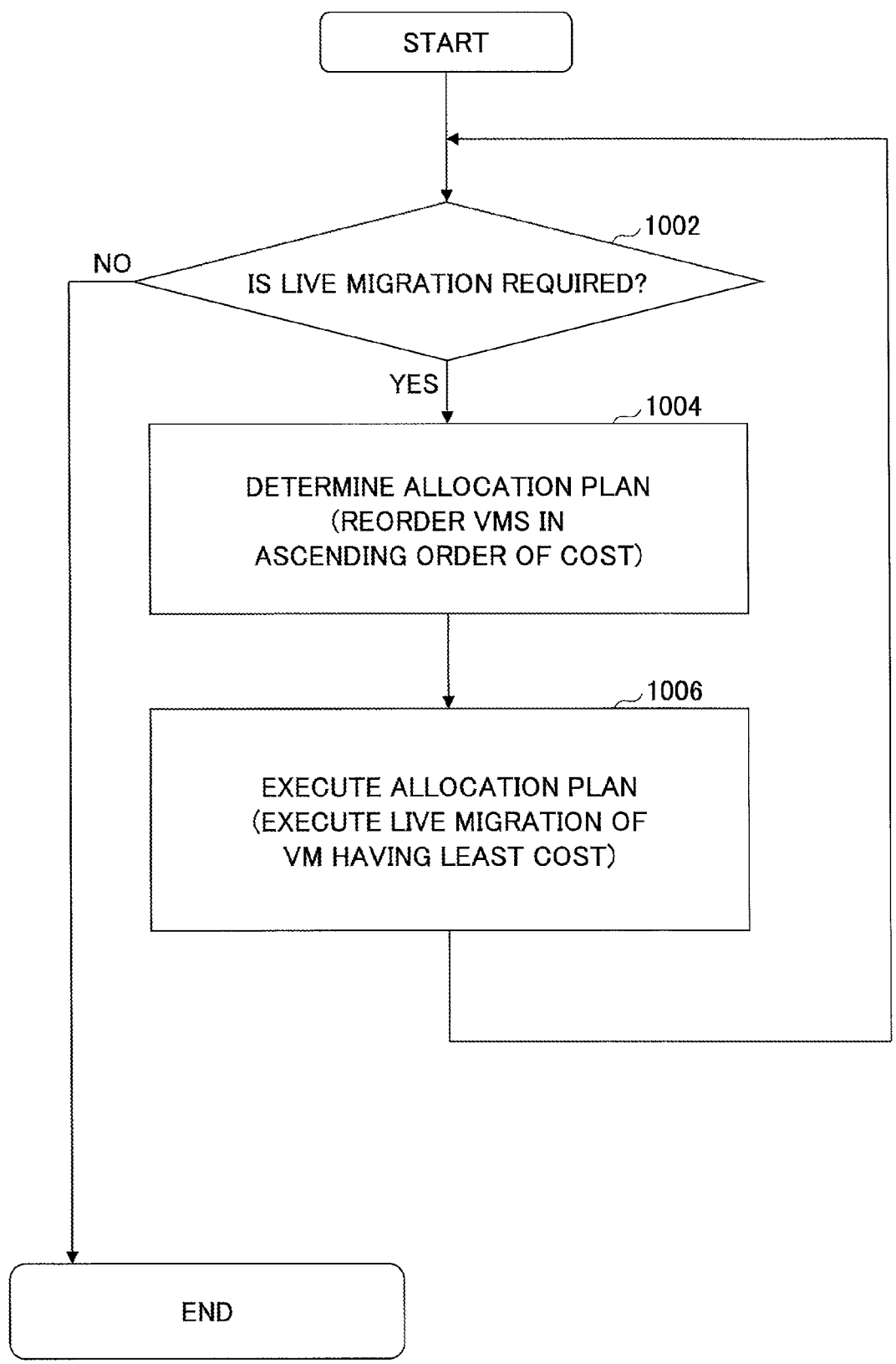
FIG. 10 is a schematic view illustrating an example of a plan determination and an execution of live migrations.

FIG. 10 illustrates an example of a plan determination and an execution of live migrations executed by the allocation management unit 312.

Figure 12:
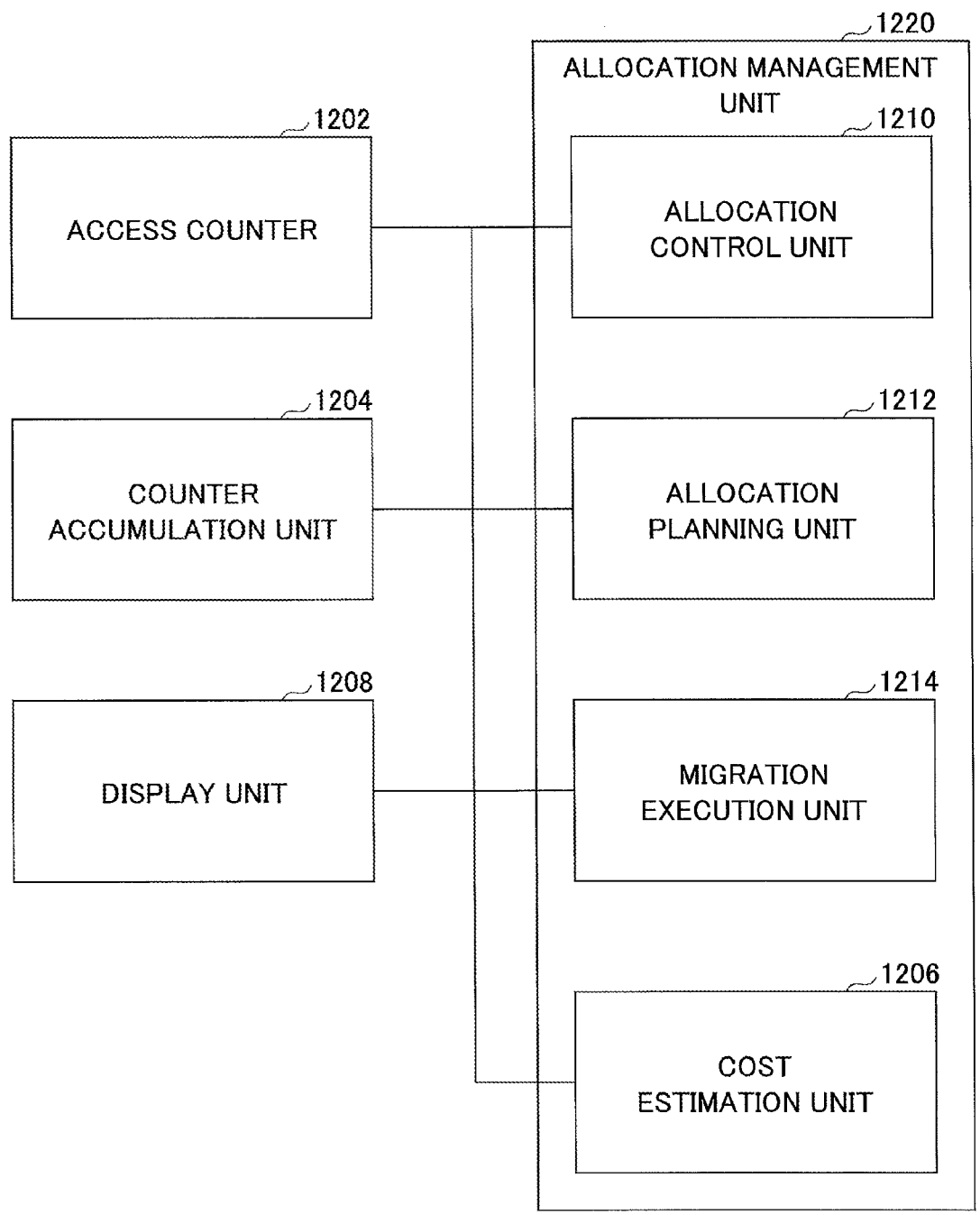
FIG. 12 is a schematic view illustrating a functional block diagram according to an embodiment.

At Step 1002, it is determined whether a live migration is required. Factors for the determination include a command of an operator, a rise of operation rate on a specific physical machine, a planned rise of operation rate, maintenance of a physical machine, a version upgrade of the VM management unit, an aggregation of virtual machines to a physical machine for reducing power consumption, and a correlation with the operation rate on the specific physical machine. If the determination result is "NO", the process ends. If the determination result "YES", the process goes to Step 1004. In the following description of the process, FIG. 3 and FIG. 12 are also referred to.

At Step 1004, an allocation plan is determined by an allocation planning unit 1212 in the allocation management unit 312 (1210). As an example of an allocation plan, virtual machines are reordered in ascending order of estimated costs (estimated values of memory transfer time). Then, the allocation plan is determined so that live migrations will be started with a first virtual machine in this order. As a destination physical machine of movement, a physical machine may be selected that has the least operation rate among physical machines, or it may be predetermined. Or, it may be specified by an operator.

At Step 1006, live migrations are executed based on the determined allocation plan. As described with reference to FIG. 8, if the estimated cost exceeds the threshold value during execution of a live migration, the live migration may be stopped.

Figure 11:
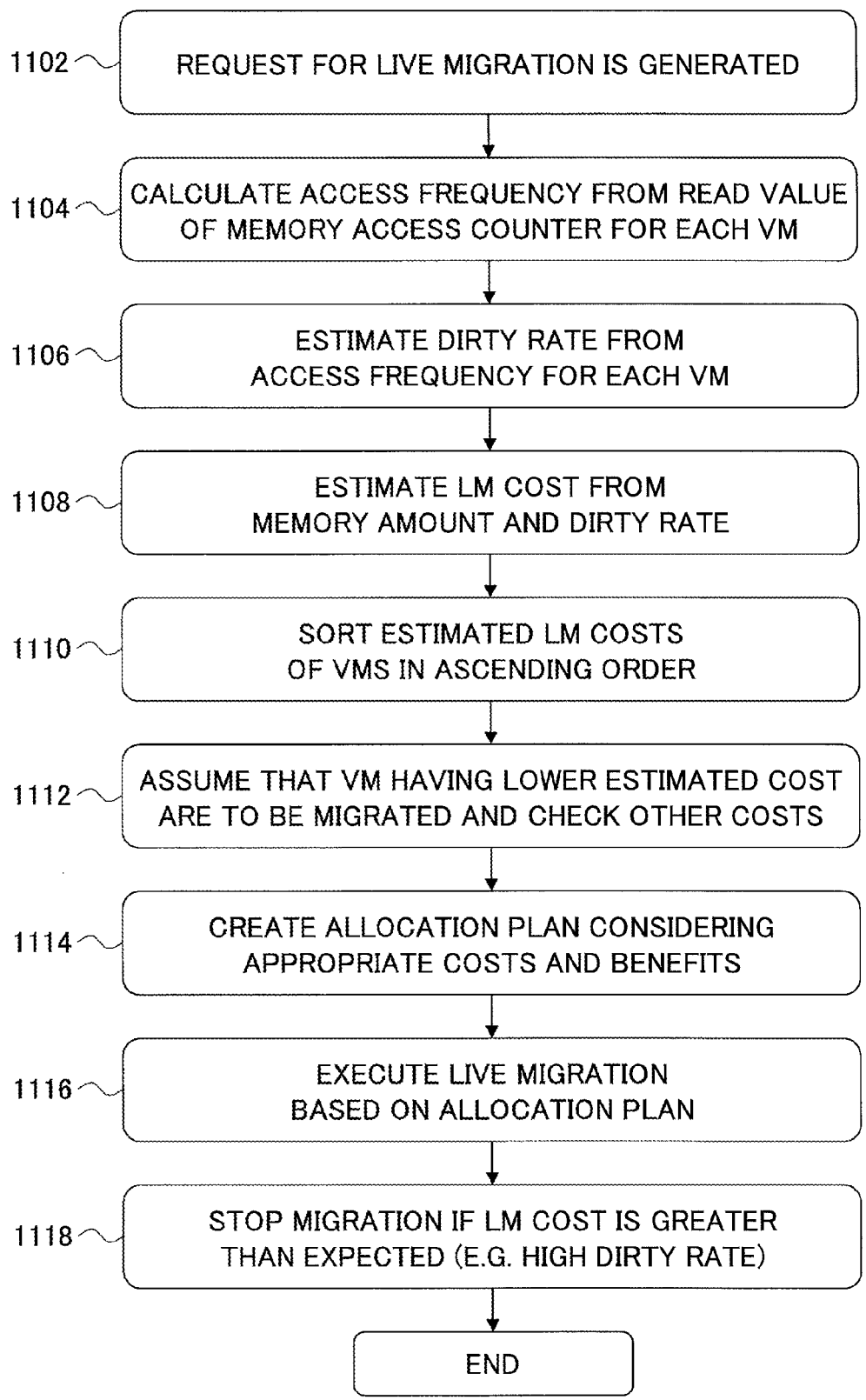
FIG. 11 is a schematic view illustrating another example of a series of steps of a live migration.

FIG. 11 illustrates another example of a series of steps of a live migration.

At Step 1102, a request for a live migration is generated, and this process is started.

At Step 1104, an access frequency is calculated from the read value of the memory access counter for each virtual machine.

At Step 1106, the dirty rate is estimated from the access frequency for each of the virtual machines.

At Step 1108, an estimated value of memory transfer time, namely, an estimated cost of a live migration is calculated from at least the memory amount, the dirty rate, and the transfer bandwidth.

At Step 1110, the estimated live migration costs of the virtual machines are sorted in ascending order.

At Step 1112, virtual machines having lower estimated costs are tentatively prioritized to be migrated. Other costs are checked that include correlations with the other virtual machines, importance of stable operation, and fluctuation factors of the cost in the future.

At Step 1114, an allocation plan is created so that a live migration order is determined considering appropriate costs and benefits obtained at Step 1112. Note that to select an appropriate order, an evaluation function may be determined beforehand that takes various factors at Step 1112 into consideration, and the allocation plan may be determined that includes an optimal live migration order based on output results of the evaluation function.

At Step 1116, live migrations are executed in order based on the allocation plan.

At Step 1118, as already described with reference to FIG. 8, the live migration may be stopped even if the live migration is being executed as long as the estimated cost is great.

Thus, the process of live migrations is executed. Note that the steps described above may be executed in a different order of the steps, or multiple steps may be executed concurrently unless any contradictions arise.

FIG. 12 illustrates a functional block diagram according to an embodiment of the present invention.

An access counter 1202 is an access counter for a memory.

A counter accumulation unit 1204 is a set of counters that accumulates and stores the contents of plural of the access counters 1202, for example, for respective virtual memories.

A cost estimation unit 1206 calculates an estimated value of memory transfer time from a value of the counter accumulation unit 1204, a transfer bandwidth, and a physical memory capacity of a virtual machine, as an estimation of the cost of a live migration. The cost estimation unit 1206 may be a part of the allocation management unit 1220 below.

A display unit 1208 may display the estimated cost and dirty rate of each virtual machine, an allocation plan, and a state of progression of live migrations.

The allocation management unit 1220 includes the allocation control unit 1210, the allocation planning unit 1212, and a migration execution unit 1214. In addition, the cost estimation unit 1206 may be included as described above.

The allocation planning unit 1212 may tentatively prioritize live migrations having smaller estimated costs for migration. Other costs may be checked that include correlations with the other virtual machines, importance of stable operation, and fluctuation factors of the cost in the future. Further, an allocation plan is created so that live migration order is determined considering overall costs and benefits. Note that to select an appropriate order, an evaluation function may be determined beforehand that takes various factors into consideration, and the allocation plan may be determined that includes an optimal live migration order based on output results of the evaluation function.

The migration execution unit 1214 executes migrations based on the allocation plan.

The allocation control unit 1210 manages migrations as a whole. For example, the allocation control unit 1210 may stop a live migration even if the live migration is being executed as long as the estimated cost is great.

Figure 13:
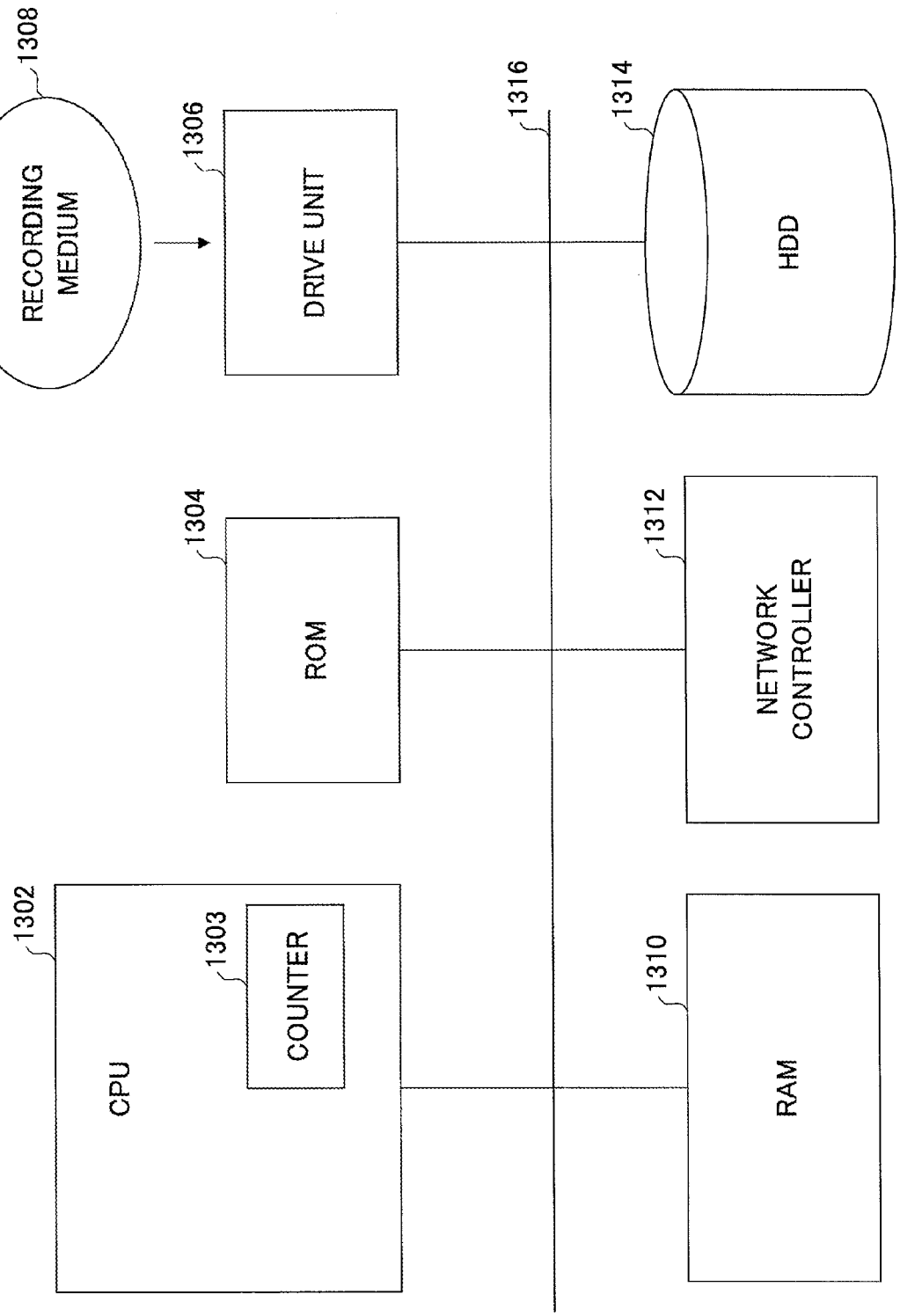
FIG. 13 is a schematic view illustrating a hardware configuration of a server and a VM management apparatus.

FIG. 13 illustrates a hardware configuration of servers and the VM management apparatus 310, which are physical machines.

The physical machine may include a CPU 1302, a ROM 1304, a drive unit 1306, a RAM 1310, a network controller 1312, and an HDD 1314. These units are connected with each other by a bus 1316.

The CPU 1302 may include a performance counter 1303. Also, the drive unit 1306 can read and write to a recording medium 1308 in which programs are stored. A program read from the recording medium 1308 can be executed by the CPU 1302.

Note that the program may be stored in the portable recording medium 1308. The portable recording medium 1308 is one or more non-transitory storage media having a structure. For example, the portable recording medium 1308 may be a magnetic storage medium, an optical disk, an optical-magnetic storage medium, a non-volatile memory, or the like. A magnetic storage medium may be an HDD, a flexible disk (FD), a magnetic tape (MT), or the like. An optical disk may be a DVD (Digital Versatile Disc), a DVD-RAM, a CD-ROM (Compact Disc-Read Only Memory), a CD-R (Recordable)/RW (ReWritable), or the like. Also, an optical-magnetic storage medium may be an MO (Magneto-Optical disk), or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having a program stored therein for causing a computer to execute a process, the process comprising:
estimating a cost of executing a live migration of a virtual machine, using a count value of an access counter for counting the number of accesses to a memory allocated to the virtual machine, a capacity of the memory, and a bandwidth of data transfer between physical machines relating to the live migration.

2. The non-transitory computer-readable recording medium as claimed in claim 1, wherein the cost is a memory transfer time.

3. The non-transitory computer-readable recording medium as claimed in claim 1, the process further comprising:
excluding the virtual machine from execution targets of the live migrations, or stopping execution of the live migration if the live migration of the virtual machine is being executed, based on a result of comparing the estimated cost with a predetermined threshold value.

4. The non-transitory computer-readable recording medium as claimed in claim 1, the process further comprising:
determining an execution plan of the live migrations of a plurality of the virtual machines, based on the estimated costs; and
executing the live migrations based on an allocation plan.

5. A method of managing a live migration of a virtual machine, executed by a computer, the method comprising:
estimating a cost of executing the live migration of the virtual machine, using a count value of an access counter for counting the number of accesses to a memory allocated to the virtual machine, a capacity of the memory, and a bandwidth of data transfer between physical machines relating to the live migration.

6. The method as claimed in claim 5, wherein the cost is a memory transfer time.

7. The method as claimed in claim 5, further comprising:
excluding the virtual machine from execution targets of the live migrations, or stopping execution of the live migration if the live migration of the virtual machine is being executed, based on a result of comparing the estimated cost with a predetermined threshold value.

8. The method as claimed in claim 5, further comprising:
determining an execution plan of the live migrations of a plurality of the virtual machines, based on the estimated costs; and
executing the live migrations based on an allocation plan.

9. An apparatus for managing a live migration of a virtual machine, comprising:
a cost estimation unit configured to estimate a cost of executing the live migration of the virtual machine, using a count value of an access counter for counting the number of accesses to a memory allocated to the virtual machine, a capacity of the memory, and a bandwidth of data transfer between physical machines relating to the live migration.

10. The apparatus as claimed in claim 9, wherein the cost is a memory transfer time.

11. The apparatus as claimed in claim 9, further comprising:
an allocation control unit configured to exclude the virtual machine from execution targets of the live migrations, or to stop execution of the live migration if the live migration of the virtual machine is being executed, based on a result of comparing the estimated cost with a predetermined threshold value.

12. The apparatus as claimed in claim 9, further comprising:
   an allocation planning unit configured to determine an execution plan of the live migrations of a plurality of the virtual machines, based on the estimated costs; and
   a migration execution unit configured to execute the live migrations based on an allocation plan.

* * * * *